United States Patent
Noll et al.

[11] Patent Number: 5,996,072
[45] Date of Patent: *Nov. 30, 1999

[54] METHOD FOR PRESERVING AND DISPLAYING TEXT ON A PC BIOS BOOT SCREEN

[75] Inventors: Michael J. Noll, Durand; Eric D. Anderson, North Hudson, both of Wis.

[73] Assignee: Micron Electronics, Inc., Nampa, Id.

[ * ] Notice: This patent issued on a continued prosecution application filed under 37 CFR 1.53(d), and is subject to the twenty year patent term provisions of 35 U.S.C. 154(a)(2).

[21] Appl. No.: 08/788,849

[22] Filed: Jan. 27, 1997

[51] Int. Cl.[6] .................................................. G06F 9/445
[52] U.S. Cl. ................................... 713/1; 713/2; 713/100
[58] Field of Search .................................... 395/118, 343, 395/344, 183.12, 652, 500, 186, 828, 830, 284, 750.05, 282, 653, 651; 364/280.2, 280, 231, 280.9, 707, 243, 244.6, 247

[56] References Cited

U.S. PATENT DOCUMENTS 4,920,432   4/1990   Eggers et al. ............................ 360/33.1
5,544,083   8/1996   Iizuka et al. ......................... 364/709.01
5,768,148   6/1998   Murphy et al. ........................... 364/492

Primary Examiner—Ayaz R. Sheikh
Assistant Examiner—Tim Vo
Attorney, Agent, or Firm—Dorsey & Whitney LLP

[57] ABSTRACT

The present invention relates to software used in conjunction with the BIOS POST process to preserve certain messages (referred to as "safeguarded messages") displayed on a video screen, while other messages, which are considered disposable messages, are not preserved on the screen. In one embodiment, prior to displaying a message, the software determines whether the generated message is a safeguarded message. The software then displays safeguarded messages and disposable messages on the video screen on preselected lines assigned to each category. Once the video screen is full of disposable messages and an additional message is to be displayed, a disposable message is removed from the screen leaving a character display line empty. The additional message is displayed on the newly-empty character display line. During the removal of a disposable message and the displaying of the additional message, the safeguarded messages are preserved on the screen.

50 Claims, 8 Drawing Sheets

METHOD FOR PRESERVING AND DISPLAYING TEXT ON A PC BIOS BOOT SCREEN

TECHNICAL FIELD

The present invention relates to displaying messages during start-up and initial testing of a computer. In particular, the present invention relates to a method for preserving and displaying text on a Basic Input/Output System ("BIOS") boot screen.

BACKGROUND OF THE INVENTION

When a personal computer initially is turned on, a Basic Input/Output System ("BIOS") program is enabled. The BIOS program controls the keyboard, disk drives, and other devices. This program runs a process called Power On Self Test ("POST"). The POST program performs a diagnostic routine for the computer.

During this BIOS POST routine, a series of messages is displayed on a video screen. One such message is an instruction ("instructional message") to the user on how to access a BIOS setup program ("BIOS SETUP"). A BIOS SETUP is a computer program that allows a user to determine and, if the user so desires, to modify the system parameters. That is, through the BIOS SETUP program, the user may change the configuration of the computer.

Currently, when the video screen is full of messages generated during the BIOS POST process, the instructional message, which appears early in the BIOS POST process, is written over by other messages. This overwriting of the instructional message makes it wholly or partially unviewable and may prevent the user from knowing how to enter the BIOS SETUP program. Moreover, a partially overwritten, corrupted message is unsettling and may suggest to the user that there is a malfunction. Clearly, it would be desirable to preserve instructional messages on the display screen during the BIOS POST process or other messages of continuing interest.

SUMMARY OF THE INVENTION

The present invention relates to software used in conjunction with the BIOS POST process to preserve certain messages (referred to as "safeguarded messages") displayed on a video screen, while other messages, which are considered disposable messages, are not preserved on the screen. In one embodiment, prior to displaying a message, the software determines whether the generated message is a safeguarded message. The software then displays safeguarded messages and disposable messages on the video screen on preselected lines assigned to each category. Once the video screen is full of disposable messages and an additional message is to be displayed, a disposable message is removed from the screen leaving a character display line empty. The additional message is displayed on the newly-empty character display line. During the removal of a disposable message and the displaying of the additional message, the safeguarded messages are preserved on the screen.

DETAILED DESCRIPTION OF THE PREFERRED EMBODIMENT

Figure 1:
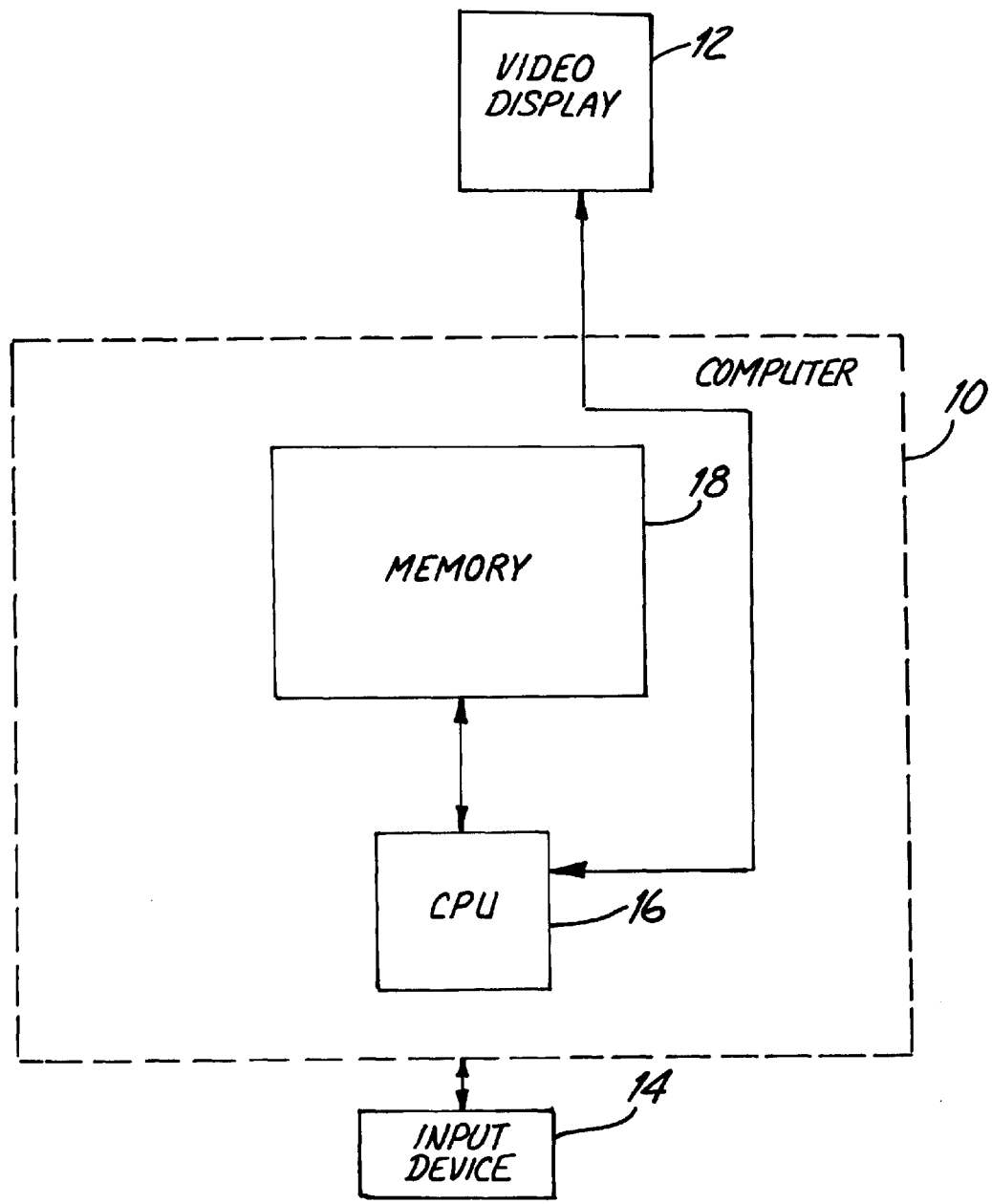
FIG. 1 shows a block diagram of a prior art computer system to which the invention is applicable.

FIG. 1 shows a computer 10 having a video display 12, such as a CRT monitor, and an input device 14, such as a keyboard. The computer 10 has a central processing unit ("CPU") 16 and memory 18. The CPU 16 executes programs that reside within the memory 18 of the computer 10.

Figure 2:
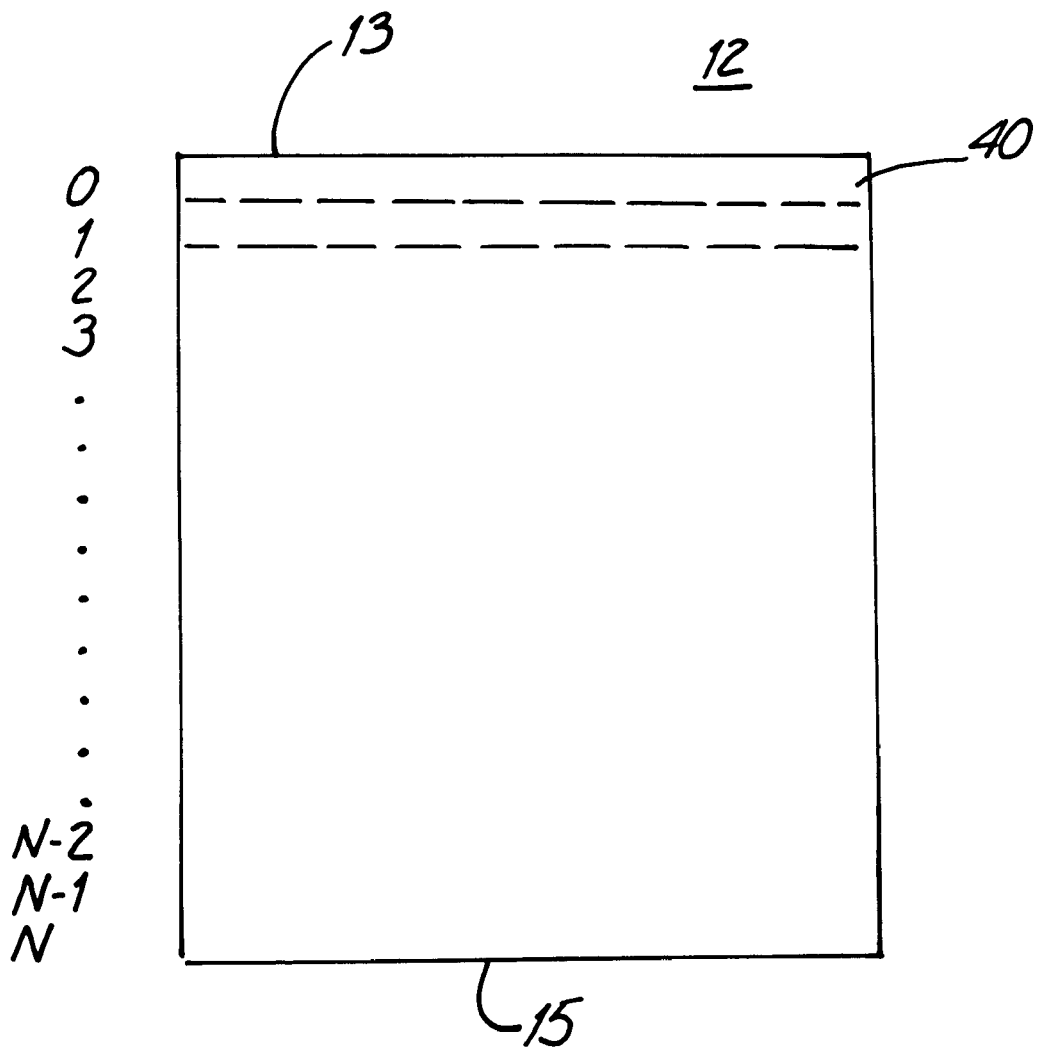
FIG. 2 shows a prior art video display having a number (N+1) of video lines.

FIG. 2 shows a video display 12 having a top 13 and a bottom 15. The video display or video screen 12 has a limited capacity. That is, the video display 12 has a limited number of character display lines 40. As shown in FIG. 2, the video display 12 has N+1 number of character display lines 40. The first character display line 40 (number 0) is closest to the top 13 of the screen 12, and last character display line 40 (number N) is closest to the bottom 15 of the screen 12. In a standard video display 12, there are twenty-five character display lines 40. Each character display line 40 has the capability to receive a plurality of characters. Generally, each character display line 40 may receive up to eighty (80) characters.

Figure 3:
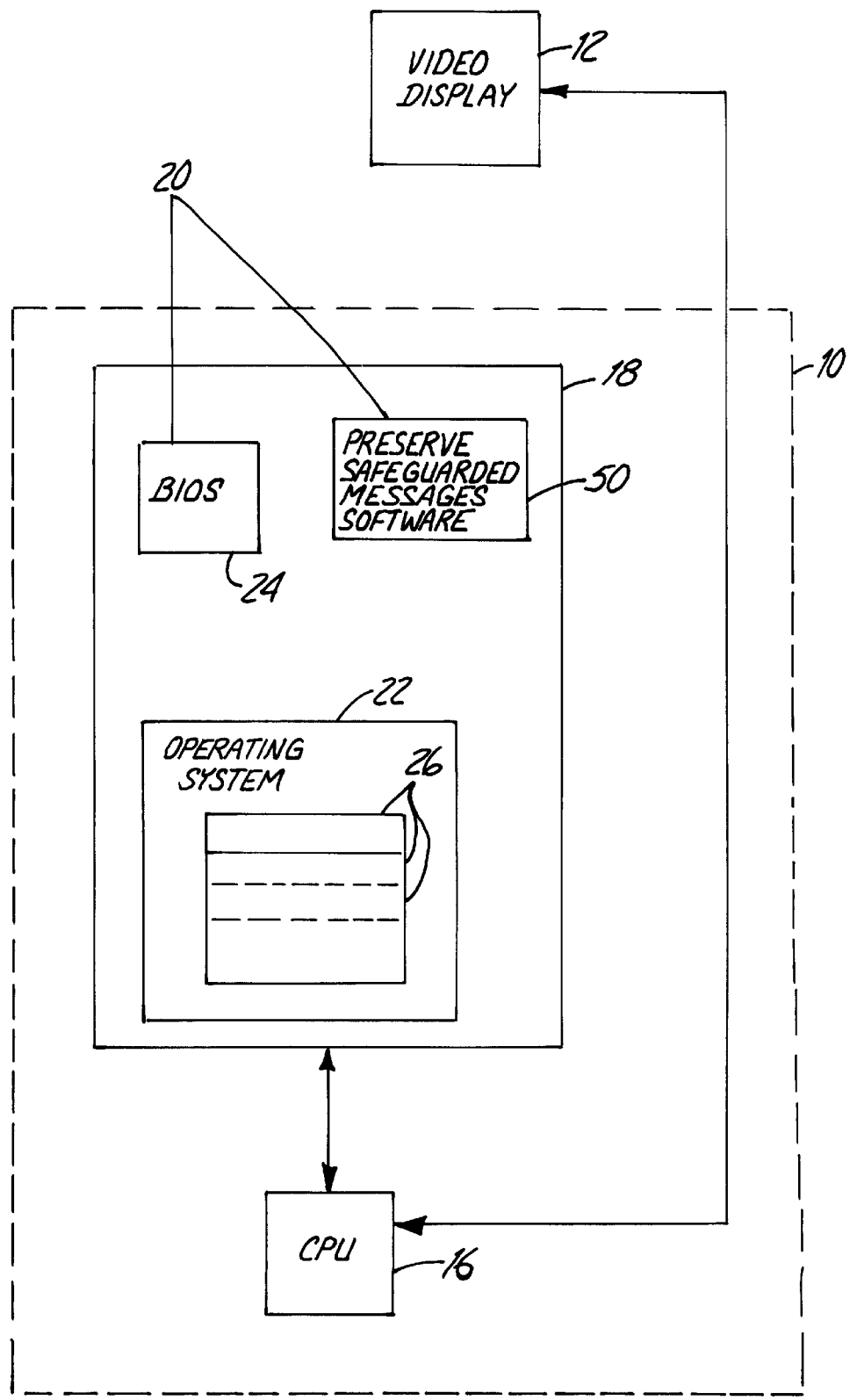
FIG. 3 shows a block diagram of a central processing unit and its interrelationship with a video display and memory devices for storing system software and the inventive software.

FIG. 3 shows a more detailed block diagram of the computer 10 shown in FIG. 1. The computer 10 has a CPU 16 and memory 18. Memory 18 contains a plurality of start-up programs 20 and boot-up portions of an operating system 22, which comprises a plurality of system files 26. Two such programs 20 are the Preserve Safeguarded Messages Software program 50 of the present invention and a BIOS program 24. The steps performed by the software 50 to preserve safeguarded messages will be described later in detail with reference to FIGS. 5 to 7. Before describing the software 50 of the present invention, a brief description of the BIOS program 24 will be provided. In the preferred embodiment, this BIOS program 24 is a commercially available product that is purchased and installed by the computer manufacturer into the computer 10. Companies offering PC BIOS software include: Phoenix Technologies, Ltd.; Award Software International, Inc.; AMI; and System-Soft Corporation.

Description of BIOS Program

A BIOS program 24 is a set of programs usually stored permanently in a read only memory ("ROM") segment of memory 18 that provides the most basic control and management of the computer's hardware. When a user turns on the computer 10, the BIOS program 24 conducts a series of complex tests of the devices installed on the computer 10. During run-time, the BIOS program 24 provides the Operating System 22 and application programs with access to these devices.

Figure 4:
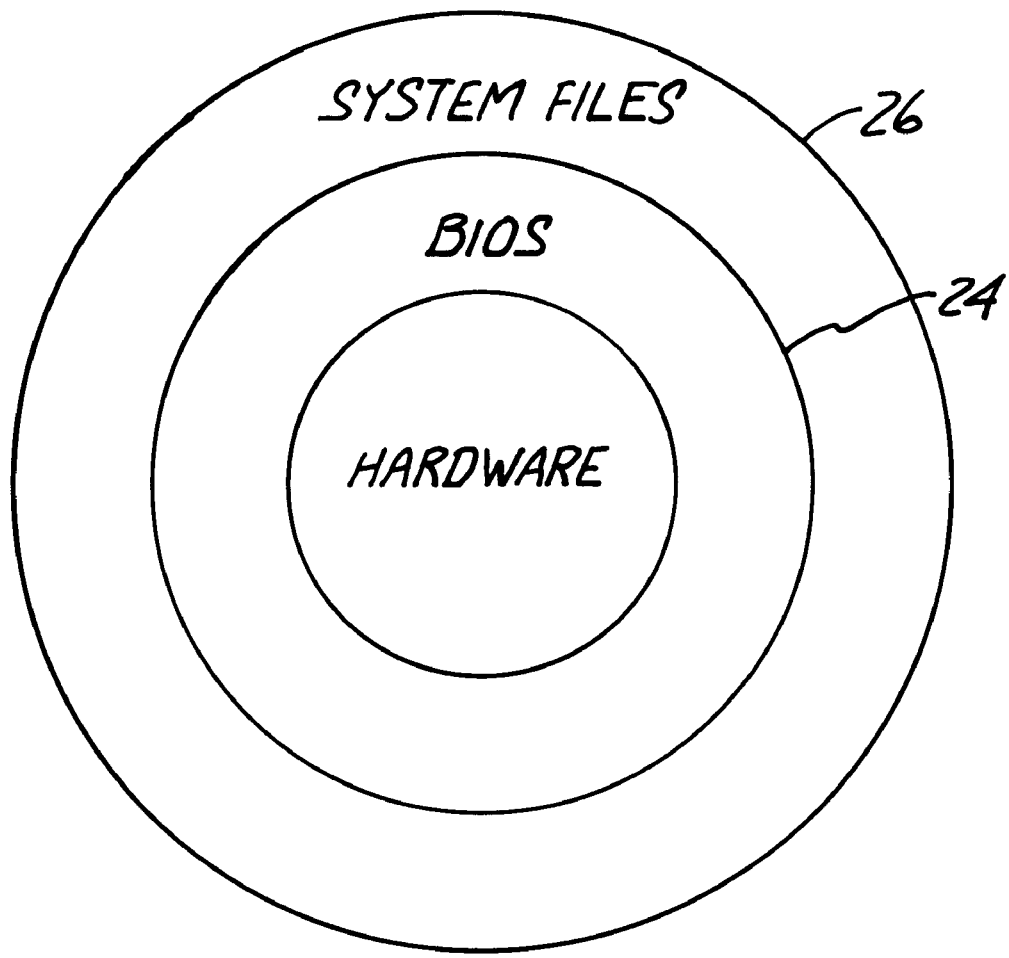
FIG. 4 shows the prior art interrelationship between the hardware, the BIOS program, and the other software on the computer system.

Software is usually designed to operate in layers, and the BIOS program 24 is the bottom-most software layer in the computer 10 (as shown in FIG. 4). It functions as the interface between the hardware and the other layers of software, isolating them from the details of how the hardware works. This arrangement enables the user to change hardware devices without having to install a new operating system 22.

The BIOS Program Functions

The BIOS program 24 has two basic functions:

A. Initialize and configure the computer 10

B. Provide run-time BIOS Services

The present invention relates to the first function, in particular, to software inserted in or linked to the BIOS program 24 that operates and modifies the operation of the BIOS program 24 during the initialization and configuration of the computer 10.

FIG. 4 illustrates the second function and the relationship between the system files 26, the BIOS program 24, and the hardware in the computer 10 during run time. The system files 26 are part of the operating system 22. When the computer 10 is started, the system files 26 are loaded in memory 18, usually random access memory. The system files 26 form a unified set of routines for controlling and directing the computer's operations. The system files 26 interact with the BIOS program 24 which is copied into random access memory ("RAM") 18 from the ROM segment of memory 18 for execution of runtime services. The BIOS program 24 links requests made from the system files 26 to the hardware.

Initialize and Configure the Computer

The first job of a BIOS program 24 is to initialize and configure the computer hardware when the user turns on the computer 10 ("system boot"). The BIOS program 24 runs the POST routine, which performs a number of tasks, including:

Test Random Access Memory (RAM)

Conduct an inventory of the hardware devices installed in the computer

Configure hard and floppy disks, keyboard, and serial and parallel ports

Configure other devices installed in the computer such as CD-ROM drives and sound cards Initialize computer hardware required for computer features such as Plug and Play and Power Management Run Setup if requested Load and run the Operating System such as DOS, OS/2, UNIX, or Windows '95

During the performance of these system boot tasks, the BIOS program 24 generates a plurality of messages that are displayed on the character display lines 40 of the video display 12 (see FIG. 2). During the BIOS POST process, for convenience and further reference of the user, the present invention preserves certain of these messages on the video display 12. (Hereinafter these messages will be referred to as "safeguarded messages"). However, other messages generated during the BIOS POST process do not need to be preserved on the video display 12. (Hereinafter these messages will be referred to as "disposable messages"). Safeguarded messages may be instructional messages (such as instructions on how to enter BIOS SETUP) or other informational messages of continuing interest. Each message generated during the BIOS POST process is written into a character display line 40. The video display 12 may display up to N+1 number of messages on the display 12 at one time, assuming one message per character display line 40.

Preferred Embodiments

Figure 5:
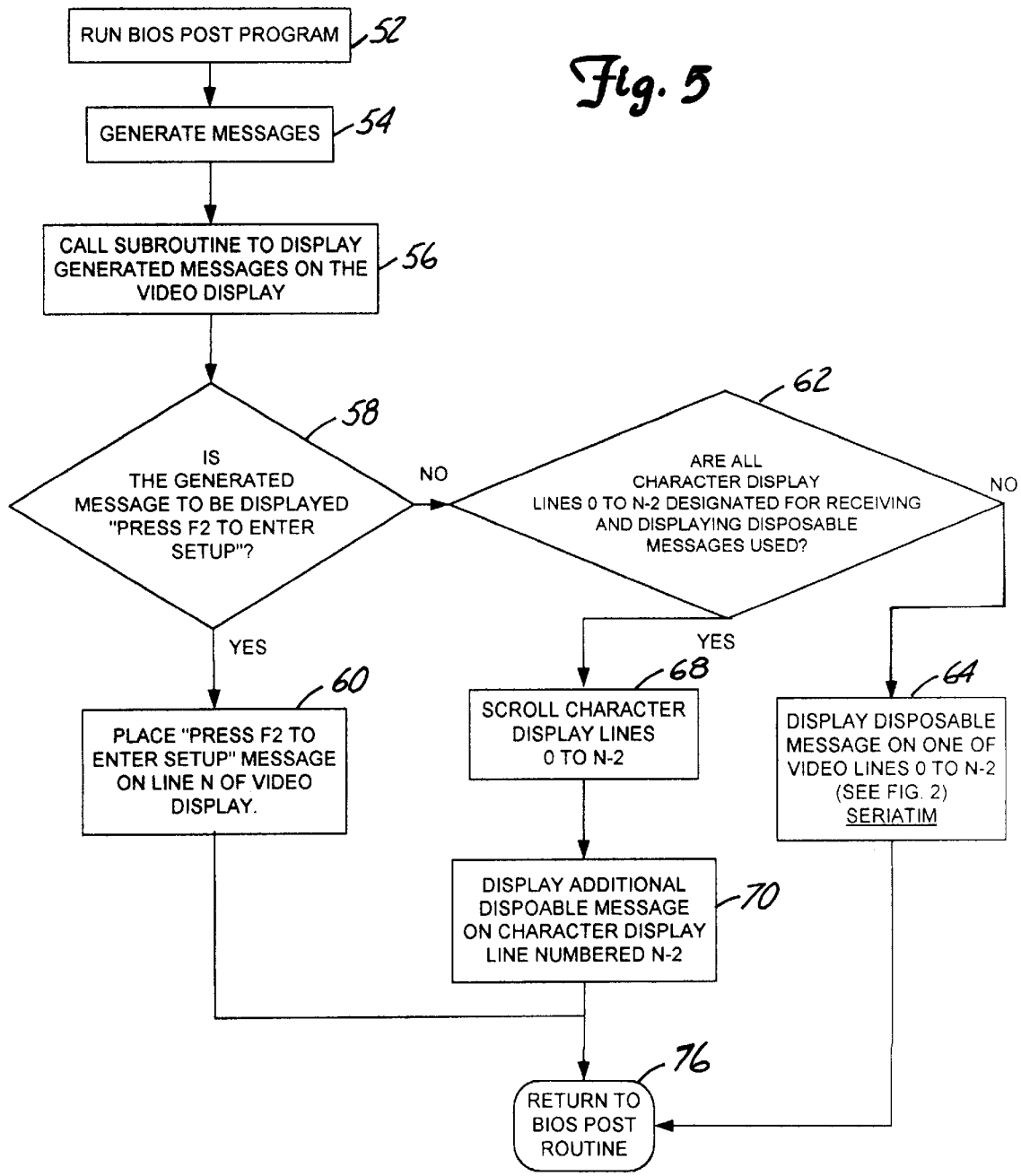
FIG. 5 is a flow chart of steps followed by the software of the present invention to preserve and display text on a BIOS boot screen.
Figure 6:
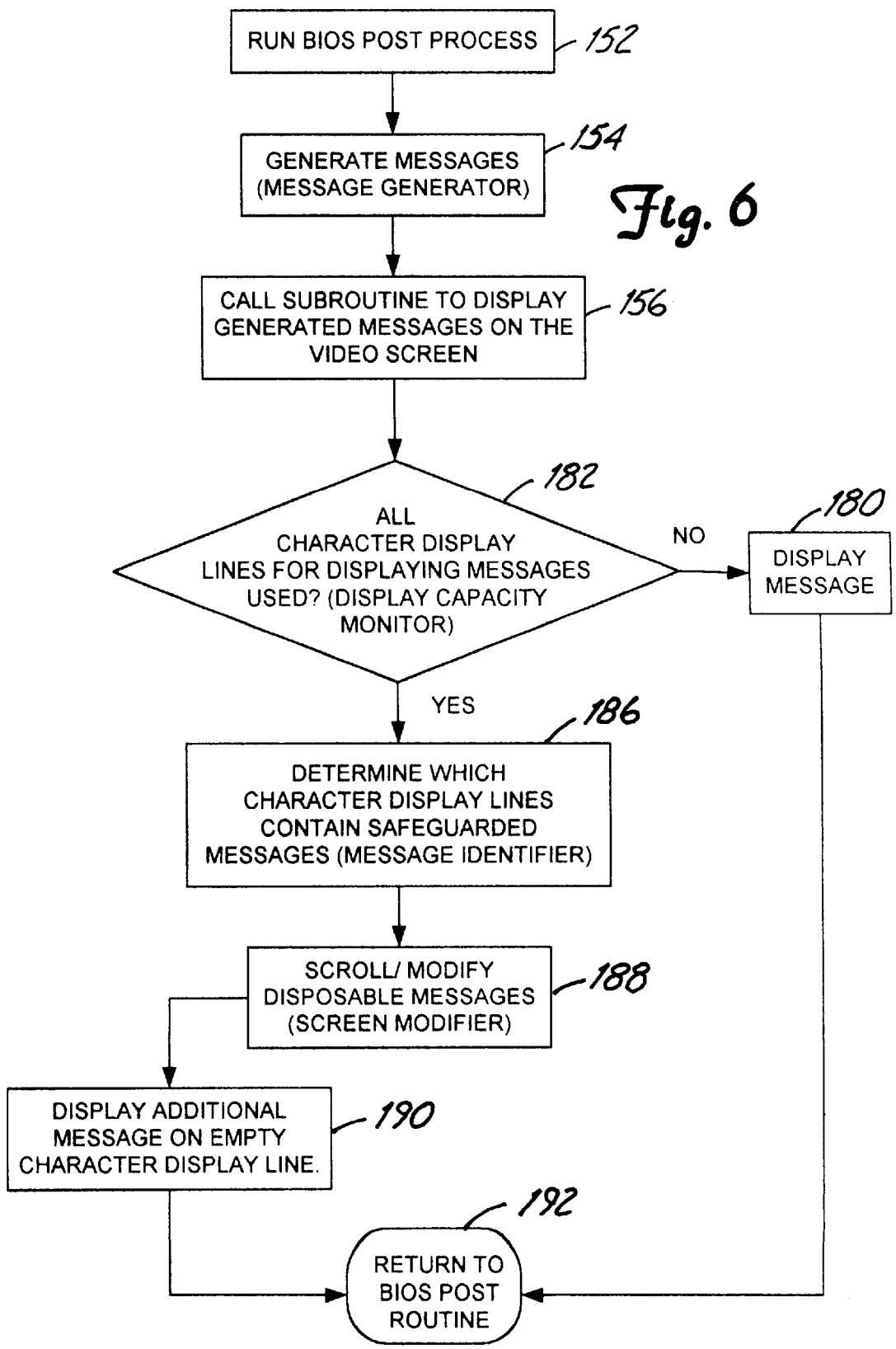
FIG. 6 is a flow chart of steps performed by an alternative embodiment of the software of the present invention to preserve and display text on a BIOS boot screen.
Figure 8:
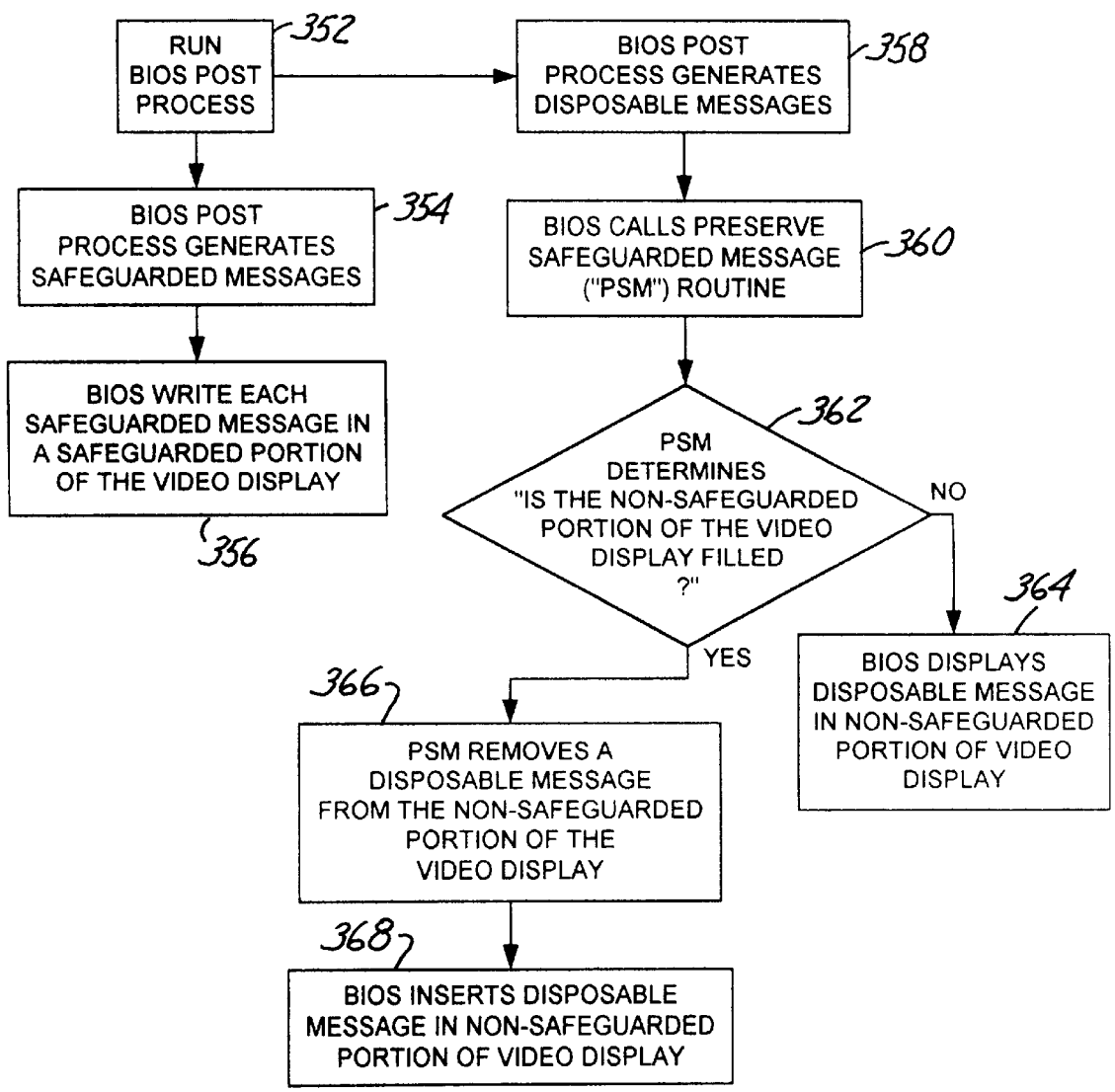
FIG. 8 is a flow chart of the steps performed by the software of the present invention in the preferred embodiment to preserve and display text on a BIOS boot screen.

The present invention relates to computer software 50 (referred to as "Preserve Safeguarded Messages" in FIG. 3) stored with or linked to the BIOS program 24 that operates on the CPU 16 in conjunction with the BIOS program 24 during initialization and configuration to preserve safeguarded messages. In the preferred embodiment, the software code to Preserve Safeguarded Messages Software program 50 is part of the BIOS program 24. FIGS. 5, 6, and 8 are flow charts showing three alternative embodiments of the steps performed by the software 50 to preserve safeguarded messages. A suitable commercially available BIOS program 24 to which the present invention may be adapted is the BIOS program from Phoenix Technologies, Ltd.

FIG. 5 is a flow chart showing the steps performed by the computer software 50 of the present invention operating on the CPU 16 for displaying and preserving safeguarded messages. As described previously, the user turns on the computer 10. At step 52, the BIOS program 24 starts the BIOS POST process. At step 54, as is conventional during the BIOS POST process 52, a plurality of messages will be generated by the various routines in the BIOS ("message generator"). At step 56, these various routines in the BIOS call a subroutine with a message to be displayed. Upon receiving the call to display a new message ("subroutine call receiver"), the following steps are performed to display the new message and preserve any safeguarded messages.

At step 58, prior to displaying each message, the software 50 of the present invention determines whether each of the generated messages to be displayed is a safeguarded message ("message identifier"). This step may be achieved by checking the content of the message or by basing the determination on the destination of the generated message.

If the generated message is a safeguarded message, then, at step 60, it is displayed on a character display line 40 preselected for displaying safeguarded messages. Generally, the number of safeguarded messages to be displayed is known. Thus, the requisite number of character display lines 40 necessary for displaying the safeguarded messages and location of the character display lines 40 on which the safeguarded messages will be displayed may be preselected by the programmer. Consequently, there can be a character display line 40 allocated for each safeguarded message that is generated during the execution of the BIOS POST process. If a safeguarded message is generated and a preselected character display line 40 is not available for displaying the message, then an error message will be provided to the user. At step 76, after displaying the safeguarded message at step 60, control is returned to the BIOS POST routine. When there is another message to be displayed, the subroutine for displaying messages on the video display 12 will be called.

If, at step 58, it is determined that the generated message is not a safeguarded message, then the message is a disposable message. Before displaying a disposable message, at step 62, the software 50 of the present invention determines whether there is an available character display line 40 on which the message may be displayed (i.e., the software determines whether all character display lines 40 preselected to display disposable messages have been used) ("display capacity monitor"). At step 64, if a character display line 40 is available, then the disposable message is displayed on that character display line 40. At step 76, after displaying the disposable message at step 64, control is returned to the BIOS POST routine. When there is another message to be displayed, the subroutine for displaying messages on the video display 12 will be called.

If another message is to be displayed, then, at step 58, the software (1) determines if it is a safeguarded or disposable message, and (2) displays the message accordingly (see steps 60 or 64). If the message is a safeguarded message, then it will be displayed in one of the character display lines 40 allocated for such messages. Eventually, all the character display lines 40 that are preselected to display disposable messages will be used. Once that state is reached and there is an additional message to be displayed and the software has determined that this additional message is a disposable message, step 62 causes branching to step 68. Then, at step 68, the character display lines 40 not allocated to safeguarded messages are modified or scrolled ("screen modifier"). While a variety of scrolling or other modification techniques could be used, in the present invention, the scrolling or modification at step 68 causes at least one disposable message to be scrolled off or removed from the display 12 and to make available a character display line 40 preselected for displaying disposable messages. Preferably, the disposable message that has been on the screen 12 the longest time will be scrolled off or removed. At step 70, the additional disposable message is then displayed on the available character display line 40. At step 76, after displaying the disposable message at step 70, control is returned to the BIOS POST routine. When there is another message to be displayed, the subroutine for displaying messages on the video display 12 will be called.

Each time a BIOS POST routine calls the subroutine to display a message on the video display and the message is disposable and a character display line for displaying disposable messages is not available, the steps of scrolling the disposable messages 68 and displaying the additional messages 70 are performed. These steps performed by the software ensure that the safeguarded messages will have all been preserved, with only disposable messages overwritten, scrolled off, or otherwise modified.

FIG. 6 is a flow chart showing an alternative set of steps performed by the software operative on the CPU 16 for displaying and preserving safeguarded messages. At step 152, the BIOS program 24 performs the POST process. At step 154, during the BIOS POST process 152, messages are generated. At step 156, the BIOS POST routine calls a subroutine with a message for display on the video screen 12. Upon receiving the call to display a new message, the following steps are performed to display the new message and preserve any safeguarded messages. At step 182, the software 50 determines whether all the character display lines 40 available for displaying messages are filled with messages. At step 180, if character display lines 40 are available for displaying a message (safeguarded or disposable), then the message presented by a BIOS POST routine for display is displayed. At step 192, after displaying the message (disposable or safeguarded) at step 180, control is returned to the BIOS POST routine. When there is another message to be displayed, the subroutine for displaying messages on the video display 12 will be called. Each time the subroutine is called to display a newly generated message, the message is displayed seriatim until the video screen 12 is full of messages.

If all the character display lines 40 are filled with messages and there is an additional message to be displayed, then the software 50 of the present invention branches to step 186. At step 186, the software 50 determines which character display lines 40 contain safeguarded messages. This determination may be accomplished by comparing the text on a character display line 40 to other indicia stored in memory 18 or by the location of the message on the screen 12 in relation to other messages generated during the BIOS POST process 52.

Next, at step 188, the disposable messages only are scrolled or otherwise modified. While a variety of scrolling or modification techniques could be used, in the present invention, the scrolling or modification at step 188 causes at least one disposable message to be scrolled off or removed from the display 12 and to make available a character display line 40 for displaying additional messages. At step 190, the additional message is displayed on the character display line 40 made available by the scrolling or modification step. At step 192, after displaying the newly generated message (safeguarded or disposable) at step 190, control is returned to the BIOS POST routine. When there is another message to be displayed, the subroutine for displaying messages on the video display 12 will be called. These steps performed by the software ensure that the safeguarded messages will have all been preserved, with only disposable messages overwritten, scrolled off, or otherwise modified.

In both methods described in FIGS. 5 and 6, the step of scrolling the messages for displaying an additional message once the video display 12 is full may be accomplished in two ways: (1) all lines 40 containing disposable messages may be scrolled while each safeguarded message continues to be displayed on the line 40 in which it was originally displayed; or (2) all lines including lines that contain safeguarded messages are moved, but safeguarded messages stop moving once they reach the screen edge because they are never scrolled off the screen 12. For the first way, the disposable messages may be scrolled past any character display line containing a safeguarded message, and the safeguarded message is displayed on the video display during the scrolling. In addition to scrolling, the screen may be modified by removing a message, thereby, creating a blank line for displaying another message.

Figure 7:
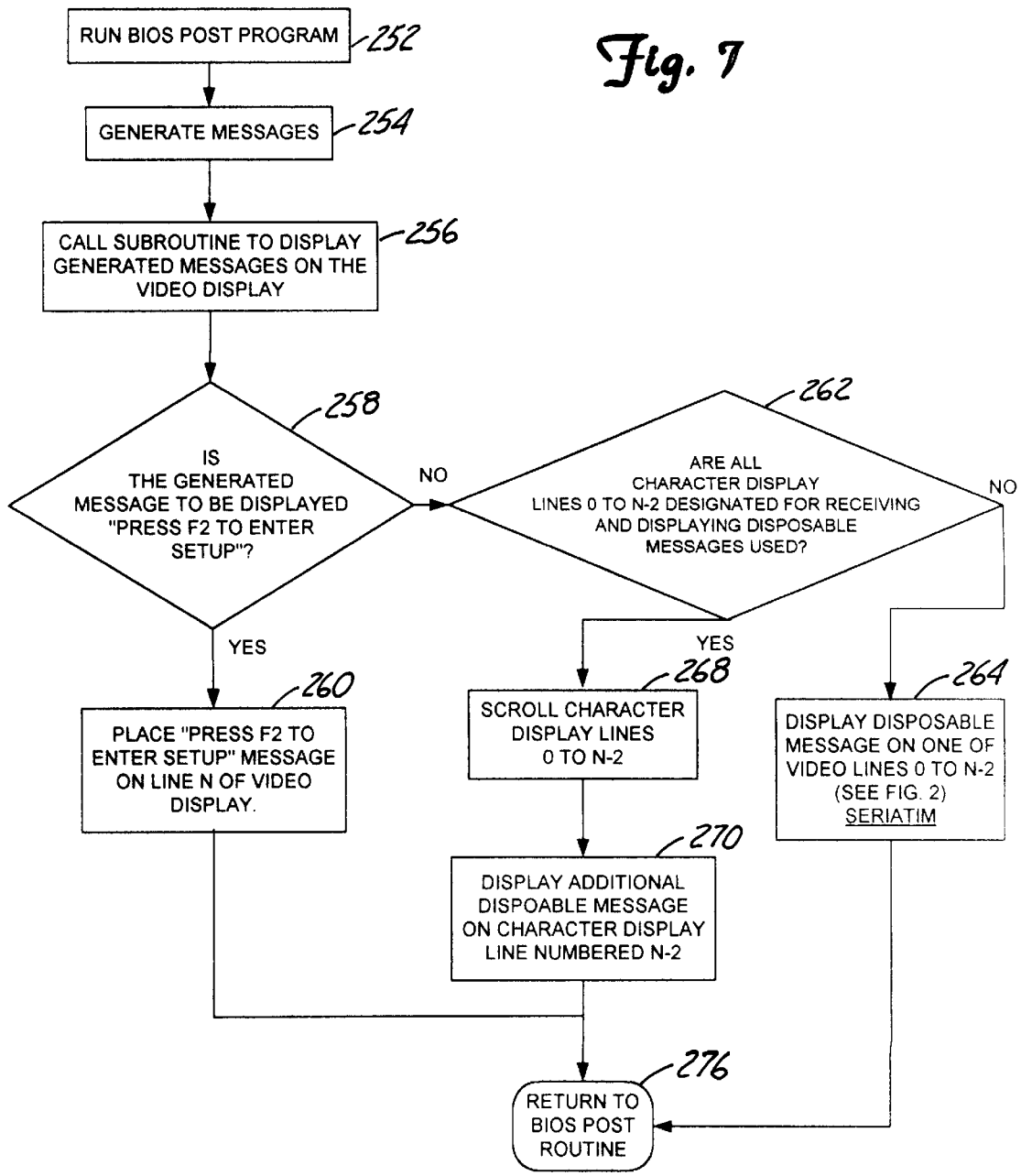
FIG. 7 is a flow chart of the steps performed by the software of the present invention to preserve and display text for entering the BIOS setup screen, which is a specific example illustrating how a safeguarded message is preserved on the screen.

With reference to FIG. 7, a specific example of the steps for preserving the instructional message "PRESS F2 TO ENTER SETUP" defined as the only safeguarded message, will be described. This example uses the general algorithm described with respect to FIG. 5. First, at step 252, the BIOS program 24 starts the BIOS POST process. At step 254, during the BIOS POST process 252, messages are generated. At step 256, a routine in the BIOS POST process calls a subroutine to display a generated message. During the BIOS POST process 252 of this example, all generated messages are disposable messages except for the message that reads "PRESS F2 TO ENTER SETUP", which is the safeguarded message.

Continuing to refer to FIG. 7, at step 258, the software 50 of the present invention determines whether the message to be displayed is "PRESS F2 TO ENTER SETUP". If the message to be displayed is "PRESS F2 TO ENTER SETUP", then, at step 260, this message is placed on line N of the video display. At step 276, after displaying the safeguarded message at step 260, control is returned to the BIOS POST routine. When there is another message to be displayed, the subroutine for displaying messages on the video display 12 will be called.

When the subroutine for displaying a newly generated message is called and the message to be displayed is not "PRESS F2 TO ENTER SETUP", then the message is considered a disposable message. At step 262, before displaying the disposable message, the software determines whether one of the character display lines 0 to N–2 is available for displaying the disposable message. If a character display line 40 is available, then, at step 264, the disposable message is displayed on the available line. At step 276, after displaying the disposable message at step 264, control is returned to the BIOS POST routine. When there is another message to be displayed, the subroutine for displaying messages on the video display 12 will be called. Each time the subroutine is called to display an additional message and the additional message is a disposable message, then steps 262 and 264 are performed until each of the lines 0 to N−2 contains a message. The disposable messages are displayed on lines 0 to N−2 seriatim (see FIG. 2). Line N−1 is left blank intentionally to set off the safeguarded message.

When each of the lines 0 to N−2 on the video display 12 contains a message and there is an additional message to be displayed and the message is a disposable message, then, at step 268, lines 0 to N−2 are scrolled upward so that the text in line 0 is scrolled off the screen and replaced with the text from line 1, and the text in line N−2 is moved up to line N−3 so that line N−2 is now blank or empty. At step 270, the additional message is displayed on the empty or available line N−2. When none of the character display lines 40 for displaying disposable messages are available and an additional disposable message must be displayed, this process (i.e., steps 268, and 270) is performed. At step 276, after displaying the disposable message at step 270, control is returned to the BIOS POST routine. When there is another message to be displayed, the subroutine for displaying messages on the video display 12 will be called. The present invention ensures that the safeguarded message is continuously displayed on the video display 12 during the BIOS POST process 252. In this specific example, throughout the system boot process, the user will be able to view the message stating how to enter the BIOS SETUP program and the message will not be corrupted.

In the embodiments described with respect to FIGS. 5 and 7, each of the character display lines 40 available for displaying messages on a screen 12 was allocated either for exclusively displaying a safeguarded message or for exclusively displaying a disposable message. Alternatively, each character display line 40 allocated for displaying safeguarded messages may be used to display a disposable message until that line is needed to display a safeguarded message.

With reference to FIG. 8, another alternative set of steps performed by the software operative on the CPU 16 for displaying and preserving safeguarded messages will be described. At step 352, the BIOS program 24 performs the POST process. At step 354, during the BIOS POST process, safeguarded messages are generated. In the preferred embodiment the safeguarded messages include the following instructional messages. "Press F2 to Enter Setup" and "Press <ESC> to Skip Memory Test". At step 356, the BIOS program 24 writes each of these safeguarded messages in a safeguarded portion of the video display. In the preferred embodiment, the safeguarded messages are written on Lines N and N−1 of the display 12.

At step 358, during the BIOS POST process, disposable messages are also generated. At step 360, prior to displaying a disposable message, the BIOS program calls the software 50 of the present invention. At step 362, the software 50 of the present invention determines whether the non-safeguarded portion of the video display 12 is filled. That is, the software 50 must determine whether one of the preselected lines 40 on the display 12 for displaying disposable messages is available.

If there is a character display line 40 available for displaying a disposable message, then, at step 364, the BIOS program 24 displays the disposable message on the available character display line 40. In the preferred embodiment, each of the disposable messages are displayed seriatim from line 0 to N−2 or N−3, depending on if there is one or two safeguarded messages.

At step 362, if the software 50 determines that there is no character display line 40 available for displaying a disposable message, then the software branches to step 366. At step 366, the software 50 removes a disposable message from the nonsafeguarded portion of the video display 12. In the preferred embodiment, this removal step is performed by scrolling the character display lines 40 in the nonsafeguarded portion of the video display 12. This step makes available a character display line 40 for displaying a disposable message.

At step 368, the BIOS program inserts the disposable message in the available character display line 40. Steps 360, 362, 366, and 368 are performed each time an additional disposable message generated during the BIOS POST routine is presented for display on the video display 12. This routine ensures that the safeguarded messages displayed by the BIOS program 24 in the safeguarded portion of the display 12 are preserved while managing the non-safeguarded portion of the video display 12 for the display of a plurality of disposable messages.

While preferred embodiments of the present invention have been described, it should be appreciated that various modifications may be made by those skilled in the art without departing from the spirit and scope of the present invention. For example, while the above discussion has assumed that each message occupies one line, the invention can be adapted to recognize and accommodate a two-line message. Also, while the invention is described as having a two-level hierarchy of safeguarded and disposable messages, a more complex hierarchy with more than two levels could be implemented. Further, a message could be assigned a safeguarded status for a defined time period or until a defined condition is met and then be removed from that status, to avoid clogging the screen with old safeguarded messages. Accordingly, reference should be made to the claims to determine the scope of the present invention.

What is claimed is:

1. An apparatus for managing a sequence of messages generated by a computer for display on a video display with limited capacity, certain of said messages being safeguarded messages and others being disposable messages, comprising:

(a) means for identifying which messages generated by the computer are safeguarded messages;

(b) means responsive to a request for displaying a new message generated by the computer for determining whether the limited capacity of the display has been reached by display of prior messages generated by the computer; and (c) means for updating the display to include the new message generated by the computer without removing from the display any safeguarded message, wherein the means for updating comprises means for automatically removing a disposable message from the display to make room for display of the new message.

2. The apparatus of claim 1 wherein the means for removing comprises means for scrolling that scrolls off the display the disposable message that has been on the display the longest time.

3. An apparatus for managing a sequence of messages generated by a computer for display on a computer display with limited capacity, certain of said messages being safeguarded messages and others being disposable messages, comprising:

(a) a processor; and (b) computer software operative by the processor comprising:
  (1) means for identifying which messages generated by the computer are safeguarded messages;
  (2) means for determining whether the limited capacity of the display has been reached by display of prior messages generated by the computer in response to a request for displaying a new message generated by the computer; and
  (3) means for updating the display to include the new message generated by the computer without removing from the display any safeguarded message, wherein the means for updating comprises means for automatically removing a disposable message from the display to make room for display of the new message.

4. The apparatus of claim 3, wherein the means for removing comprises scrolling means that scrolls off the display the disposal message that has been on the display the longest time.

5. A method for displaying and preserving at least one safeguarded message on a video display having a limited number of character display lines, the method comprising:
  (a) automatically generating a set of messages wherein certain messages in the set are safeguarded messages and others are disposable messages;
  (b) determining which of the generated messages are safeguarded messages;
  (c) displaying safeguarded and disposable messages on the video display until all available character display lines on the video display have been used;
  (d) receiving an additional message to be displayed on the video display;
  (e) automatically removing a disposable message to make available a character display line on the video display for displaying the received additional message while preserving the safeguarded messages on the video display; and
  (f) inserting the additional message on the available character display line.

6. The method of claim 5, wherein the safeguarded messages are displayed on preselected character display lines.

7. The method of claim 6, wherein the step of removing is performed by scrolling the character display lines having a disposable message.

8. The method of claim 6, wherein the step of removing further comprises the steps of:
  scrolling all the character display lines on the video display; and
  ensuring that the safeguarded messages are preserved on the display.

9. A method for displaying and preserving at least one safeguarded message on a video display, the method comprising:
  (a) automatically generating a set of messages wherein certain messages in the set of messages are safeguarded message and others are disposable messages;
  (b) displaying the safeguarded and disposable messages on the video display until all character display lines on the video display have been used;
  (c) receiving at least one additional message to be displayed on the video display;
  (d) determining which of the displayed messages are safeguarded messages;
  (e) automatically removing a disposable message to make available a character display line on the video display for displaying the received additional message while preserving the safeguarded messages on the video display; and
  (f) inserting the at least one additional message on the available character display line.

10. The method of claim 9, wherein in the step of determining which of the displayed messages are safeguarded messages, the character display line in which the safeguarded message is located is determined.

11. The method of claim 9, wherein the step of removing comprises the steps of:
  scrolling all the character display lines on the video display; and
  ensuring that the safeguarded messages are preserved on the display.

12. The method of claim 10, wherein the step of removing is performed by scrolling the character display lines having a disposable message.

13. The method of claim 12, wherein the disposable messages are scrolled past the character display lines containing safeguarded messages and the safeguarded messages are displayed on the video display during the scrolling.

14. An apparatus for preserving safeguarded messages generated during a Basic Input Output System Power On Self Test ("BIOS POST") process on a video display having a predetermined number of character display lines, comprising:
  a processor connected to the video display; and
  computer software operative by the processor during the BIOS POST process comprising:
    (a) means for automatically generating a set of messages during the BIOS POST process wherein at least one message in the set of messages is safeguarded message and others are disposable messages;
    (b) means for determining during the BIOS POST process whether any of the generated messages are safeguarded messages;
    (c) means for displaying safeguarded and disposable messages on the video display until all available character display lines on the video display have been used;
    (d) means for receiving at least one additional message to be displayed on the video display;
    (e) means for removing a disposable message to make available a character display line on the video display;
    (f) means for preserving any safeguarded messages on the video display; and
    (g) means for inserting the at least one additional message on the available character display line.

15. The apparatus of claim 14, wherein the means for displaying safeguarded messages displays safeguarded messages on preselected character display lines.

16. The apparatus of claim 15, wherein the means for removing comprises means for scrolling the character display lines having a disposable message.

17. The apparatus of claim 15, wherein the means for removing comprises:
  scrolling means for scrolling all the character display lines on the video display; and
  preserving means for ensuring that the safeguarded messages are preserved on the display.

18. An apparatus for preserving safeguarded messages generated during a Basic Input Output System Power On Self Test ("BIOS POST") process on a video display having a predetermined number of character display lines, comprising:

a processor connected to the video display; and computer software operative by the processor during the BIOS POST process comprising:

(a) means for automatically generating a set of messages during the BIOS POST process wherein at least one message in the set of messages is a safeguarded message and others are disposable messages;

(b) means for displaying the safeguarded and disposable messages on the video display until all character display lines on the video display have been used;

(c) means for receiving at least one additional message to be displayed on the video display;

(d) means for determining during the BIOS POST process whether any of the displayed messages are safeguarded messages;

(e) means for removing a disposable message to make available a character display line on the video display;

(f) means for preserving any safeguarded messages on the video display; and (g) means for inserting the at least one additional message on the available character display line.

19. The apparatus of claim 18, wherein in the means for determining whether any of the displayed messages are safeguarded messages comprises means for determining the character display line in which any safeguarded message is located.

20. The apparatus of claim 18, wherein the means for removing comprises:

scrolling means for scrolling all the character display lines on the video display; and preserving means for ensuring that any safeguarded message is preserved on the display.

21. The apparatus of claim 19, wherein the means for removing comprises means for scrolling that scrolls off the character display lines having a disposable message.

22. The apparatus of claim 21, wherein the scrolling means scrolls the disposable messages past any character display line containing a safeguarded message and any safeguarded message is displayed on the video display during the scrolling.

23. An apparatus for preserving safeguarded messages displayed in a safeguarded portion of a video display by a BIOS and for displaying by the BIOS disposable messages automatically generated by the BIOS in a non-safeguarded portion of the video display such that the safeguarded messages are preserved on the display, the apparatus comprising:

(a) means responsive to an indication that another message automatically generated by the BIOS is to be written to the non-safeguarded portion of the video display;

(b) means for determining whether the non-safeguarded portion of the video display is filled;

(c) means for automatically removing a disposable message from the non-safeguarded portion of the screen; and (d) means for displaying an additional message in the non-safeguarded portion.

24. The apparatus of claim 23, wherein the means for removing comprises means for scrolling that scrolls off the display the disposable message that has been on the display for the longest period of time.

25. An apparatus for preserving safeguarded messages displayed in a safeguarded portion of a video display by a BIOS and for displaying by the BIOS disposable messages automatically generated by the BIOS in a non-safeguarded portion of the video display such that the safeguarded messages are preserved on the display, the apparatus comprising:

(a) a processor connected to the video display; and (b) computer software operative by the processor comprising:

(1) means for responding to an indication that another message automatically generated by the BIOS is to be written to the non-safeguarded portion of the video display;

(2) means for determining whether the non-safeguarded portion of the video display is filled;

(3) means for automatically removing a disposable message from the non-safeguarded portion of the screen; and (4) means for displaying the another message in the non-safeguarded portion.

26. The apparatus of claim 25, wherein the means for removing comprises scrolling means that scrolls off the display the disposable message that has been on the display the longest time.

27. A method for preserving safeguarded messages displayed in a safeguarded portion of a video display by a BIOS and for displaying by the BIOS disposable messages automatically generated by the BIOS in a non-safeguarded portion of the video display that the safeguarded messages are preserved on the display, the method comprising:

(a) responding to an indication that another message automatically generated by the BIOS is to be written to the non-safeguarded portion of the video display;

(b) determining whether the non-safeguarded portion of the video display is filled;

(c) automatically removing a disposable message from the non-safeguarded portion of the screen; and (d) displaying the another message in the non-safeguarded portion.

28. The method of claim 27, wherein the step of removing comprises scrolling that scrolls off the display the disposable message that has been on the display the longest time.

29. An apparatus for managing a sequence of messages generated by a computer for display on a video display with limited capacity, certain of said messages being safeguarded messages and others being disposable messages, comprising:

(a) a processor connected to the video display;

(b) computer software instructions operative by the processor for identifying which messages generated by the computer are safeguarded messages;

(c) computer software instructions operative by the processor for determining whether the limited capacity of the display has been reached when a newly generated message generated by the computer needs to be displayed on the video display; and (d) computer software instructions operative by the processor for updating the display to include the new message without removing from the display any safeguarded message, wherein the computer software instructions for updating comprises instructions for removing a disposable message from the display to make room for display of the newly generated message.

30. The apparatus of claim 29, wherein the computer software instructions for removing comprises instructions for scrolling that scrolls off the display the disposable message that has been on the display for the longest time.

31. An apparatus for managing a sequence of messages generated by a computer for display on a video display with limited capacity, certain of said messages being safeguarded messages and others being disposable messages, comprising:

(a) a message identifier for identifying which messages generated by the computer are safeguarded messages;

(b) a display capacity monitor for determining whether the limited capacity of the display has been reached when a newly generated message generated by the computer needs to be displayed on the video display; and (c) a screen modifier for updating the display to include the new message without removing from the display any safeguarded message, wherein the screen modifier updates the display by removing a disposable message from the display to make room for display of the newly generated message.

32. The apparatus of claim 31 wherein the screen modifier removes a disposable message by scrolling off the display the disposable message that has been on the display for the longest time.

33. An apparatus for displaying and preserving at least one safeguarded message on a video display having a limited number of character display lines, comprising:

(a) means for automatically generating a set of messages wherein certain messages in the set are safeguarded messages and others are disposable messages;

(b) means for determining which of the generated messages are safeguarded messages;

(c) means for displaying safeguarded and disposable messages on the video display until all available character display lines on the video display have been used;

(d) means for receiving an additional message to be displayed on the video display;

(e) means for automatically removing a disposable message to make available a character display line on the video display for displaying the received additional message while preserving the safeguarded messages on the video display; and (f) means for inserting the additional message on the available character display line.

34. The apparatus of claim 33, wherein the means for displaying safeguarded messages displays safeguarded messages are displayed on preselected character display lines.

35. The apparatus of claim 34, wherein the means for removing is performed by scrolling means that scrolls the character display lines having a disposable message.

36. The apparatus of claim 34, wherein the means for removing further comprises:

scrolling means for scrolling all the character display lines on the video display; and preserving means for ensuring that the safeguarded messages are preserved on the display.

37. An apparatus for displaying and preserving at least one safeguarded message on a video display having a limited number of character display lines, comprising:

(a) a message generator for automatically generating a set of messages wherein certain messages in the set are safeguarded messages and others are disposable messages;

(b) a message identifier for determining which of the generated messages are safeguarded messages;

(c) a message displayer for displaying safeguarded and disposable messages on the video display until all available character display lines on the video display have been used;

(d) a screen modifier for automatically removing a disposable message to make available a character display line on the video display for displaying an additional message by the message displayer, while preserving the safeguarded messages on the video display.

38. The apparatus of claim 37, wherein the message displayer displays safeguarded messages on preselected character display lines.

39. The apparatus of claim 38, wherein the screen modifier removes a disposable message by scrolling the character display lines having a disposable message.

40. An apparatus for displaying and preserving at least one safeguarded message on a video display, comprising:

(a) means for automatically generating a set of messages wherein certain messages in the set of messages are safeguarded message and others are disposable messages;

(b) means for displaying the safeguarded and disposable messages on the video display until all character display lines on the video display have been used;

(c) means for receiving at least one additional message to be displayed on the video display;

(d) means for determining which of the displayed messages are safeguarded messages;

(e) means for automatically removing a disposable message to make available a character display line on the video display for displaying the received additional message while preserving the safeguarded messages on the video display; and (f) means for inserting the at least one additional message on the available character display line.

41. The apparatus of claim 40, wherein the means for determining which of the displayed messages are safeguarded messages comprises means for determining the character display line in which the safeguarded message is located.

42. The apparatus of claim 40, wherein the means for removing comprises:

scrolling means for scrolling all the character display lines on the video display; and preserving means for ensuring that the safeguarded messages are preserved on the display.

43. The apparatus of claim 41, wherein the means for removing comprises means for scrolling that scrolls the character display lines having a disposable message.

44. The apparatus of claim 43, wherein the scrolling means scrolls the disposable messages past the character display lines containing safeguarded messages and the safeguarded messages are displayed on the video display during the scrolling.

45. An apparatus for displaying and preserving at least one safeguarded message on a video display, comprising:

(a) a message generator for automatically generating a set of messages wherein certain messages in the set of messages are safeguarded message and others are disposable messages;

(b) a message displayer for displaying the safeguarded and disposable messages on the video display until all character display lines on the video display have been used;

(c) a message identifier for determining which of the displayed messages are safeguarded messages; and (d) a screen modifier for automatically removing a disposable message to make available a character display line on the video display for displaying an additional message by the message displayer, while preserving the safeguarded messages on the video display.

46. The apparatus of claim 45, wherein the screen modifier scrolls the character display lines having a disposable message to remove a displayed disposable message from the video screen.

47. An apparatus for preserving safeguarded messages displayed in a safeguarded portion of a video display by a BIOS and for displaying by the BIOS disposable messages automatically generated by the BIOS in a non-safeguarded portion of the video display such that the safeguarded messages are preserved on the display, the apparatus comprising:
- (a) a subroutine call receiver responsive to an indication that another message automatically generated by the BIOS is to be written to the non-safeguarded portion of the video display;
- (b) a display capacity monitor for determining whether the non-safeguarded portion of the video display is filled;
- (c) a screen for automatically removing a disposal message from the non-safeguarded portion of the screen; and
- (d) a message displayer for displaying an additional message in the nonsafeguarded portion.

48. The apparatus of claim 47, wherein the screen modifier scrolls off the display the disposable message that has been on the display for the longest period of time.

49. A method for preserving safeguarded messages displayed in a safeguarded portion of a video display by a BIOS and for displaying by the BIOS disposable messages automatically generated by the BIOS in a non-safeguarded portion of the video display such that the safeguarded messages are preserved on the display, the method comprising:
- (a) responding to an indication that another message automatically generated by the BIOS is to be written to the non-safeguarded portion of the video display;
- (b) determining whether the non-safeguarded portion of the video display is filled;
- (c) automatically removing a disposable message from the non-safeguarded portion of the screen; and
- (d) displaying an additional message in the non-safeguarded portion.

50. The method of claim 49, wherein the step of removing comprises the step of scrolling off the display the disposable message that has been on the display for the longest period of time.

* * * * *